(12) United States Patent
Marshall et al.

(10) Patent No.: US 11,145,139 B2
(45) Date of Patent: *Oct. 12, 2021

(54) AUTOMATIC PLACEMENT AND ARRANGEMENT OF CONTENT ITEMS IN THREE-DIMENSIONAL ENVIRONMENT

(71) Applicant: Microsoft Technology Licensing, LLC, Redmond, WA (US)

(72) Inventors: Colton Brett Marshall, Seattle, WA (US); Amy Scarfone, Seattle, WA (US); Harold Anthony Martinez Molina, Seattle, WA (US); Vidya Srinivasan, Issaquah, WA (US); Andrew John Howe, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,001

(22) Filed: Jul. 6, 2020

(65) Prior Publication Data

US 2021/0005025 A1 Jan. 7, 2021

Related U.S. Application Data

(63) Continuation of application No. 15/971,212, filed on May 4, 2018, now Pat. No. 10,740,982.

(51) Int. Cl.
| | |
|---|---|
| *G06T 19/20* | (2011.01) |
| *G06F 3/0481* | (2013.01) |
| *G06T 15/20* | (2011.01) |
| *G06T 19/00* | (2011.01) |

(52) U.S. Cl.
CPC ......... *G06T 19/20* (2013.01); *G06F 3/04815* (2013.01); *G06T 15/20* (2013.01); *G06T 19/003* (2013.01); *G06T 2200/24* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2012/0290950 | A1* | 11/2012 | Rapaport | ........... H04N 21/8358 715/753 |
| 2015/0243035 | A1* | 8/2015 | Narasimha | .............. G06T 7/344 382/154 |
| 2016/0140751 | A1* | 5/2016 | Jafarkhani | ........... A61B 5/0044 382/131 |

* cited by examiner

*Primary Examiner* — YuJang Tswei
(74) *Attorney, Agent, or Firm* — Liang IP, PLLC

(57) ABSTRACT

Computing devices for automatic placement and arrangement of objects in computer-based 3D environments are disclosed herein. In one embodiment, a computing device is configured to provide, on a display, a user interface containing a work area having a template of a 3D environment and a gallery containing models of two-dimensional (2D) or 3D content items. The computing device can then detect, via the user interface, a user input selecting one of the models from the gallery to be inserted as an object into the template of the 3D environment. In response to detecting the user input, the computing device can render and surface on the display, a graphical representation of the 2D or 3D content item corresponding to the selected model at a location along a circular arc spaced apart from the default viewer position of a viewer of the 3D environment by a preset radial distance.

20 Claims, 9 Drawing Sheets

AUTOMATIC PLACEMENT AND ARRANGEMENT OF CONTENT ITEMS IN THREE-DIMENSIONAL ENVIRONMENT

CROSS-REFERENCE TO RELATED APPLICATION(S)

This application is a continuation of and claims priority to U.S. patent application Ser. No. 15/971,212, filed on May 4, 2018, the disclosure of which is incorporated herein in its entirety.

BACKGROUND

In computing, a three-dimensional (3D) environment typically refers to a computer-based simulated 3D platform in which 3D representations of images, videos, sounds, or other digital content can be presented to viewers. 3D environments can provide a more immersive viewing experience than two-dimensional (2D) environments. However, authoring content in 3D environments remains challenging because of complexities in accurate representation and interaction control of objects in 3D environments. Due to such complexities, today, only a small group of authors possess necessary technical skills to create suitable content in 3D environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Authoring content in 3D environments can be challenging because of a whole range of authoring activities that are absent from authoring in 2D environments. For example, authoring activities such as 3D content placement and arrangement, 3D interaction with the placed content items, and motion specification of the 3D content items are absent from 2D authoring. In 2D authoring, when inserting an object into a 2D environment, the inserted object can be extended horizontally, vertically, or both, from any existing objects. However, such one- or two-dimensional extension can cause occlusion in a 3D environment because an existing object can be partially or completely in front or behind the inserted object along a depth-dimension. The occlusion can cause the authored content to be obscured or confusing to a viewer. Even without occlusion, one- or two-dimensional extension of the inserted object in a 3D environment can render the object to appear smaller or bigger than the existing objects because of a distance difference from the viewer. As such, appearance uniformity of the objects can be lacking in the 3D environment.

In order to address the foregoing placement challenges, an author of 3D content typically needs to experiment with a large number of positions via trial and error to determine an optimal placement for the inserted object in a 3D environment. Such experimentation can be labor intensive, inconsistent, and may not even produce the optimal placement and/or arrangement of the objects in the 3D environment. Such imprecise placement and/or arrangement can detract user experience, or even induce headache, dizziness, or other negative physiological responses in a viewer when viewing content in the 3D environment.

Several embodiments of the disclosed technology can address at least some aspects of the foregoing challenges by automatically placing and arranging supported 2D or 3D content items as objects in a 3D environment taking into account of a combination of (i) a viewer's depth reception; (ii) the viewer's field of view; (iii) relative positions of one object relative to neighboring object in the 3D environment, and (iv) a field of view of an AR/VR/MR headset. An environment data file can then be generated based on the automatically placed objects to create a file containing 3D content that can be distributed to other computing devices for reproducing the 3D environment.

In an example implementation, an authoring application can be configured to provide a template of a 3D environment having, for instance, a background (e.g., a blue sky), a scene (e.g., a mountain), a sound (e.g., sound of wind blowing), and one or more background objects (e.g., trees on the mountain). The template of the 3D environment can also comprise one or more anchor points at which content items (e.g., a 2D or 3D representation of car, bus, plane, etc.) can be positioned within the 3D environment. The authoring application can be configured to provide a catalog of available 2D or 3D content items as a gallery, a list, or in other suitable interface format.

Upon receiving a user input selecting a content item from the catalog for insertion into the 3D environment, the authoring application can be configured to resize (e.g., height, width, etc.) the selected content item based on a preset container size as needed and determine a position of the content item from a viewer in a field of view of the viewer based on a preset distance. For example, the preset container size can be a cube having a 1, 1.5, or 2 cubic meter of volume. The preset distance can be 2.5, 3.0, 3.5 meters from the position of the viewer along a line of sight of the viewer. The authoring application can then place the resized content item as an object in the 3D environment at the preset distance from the viewer in the field of view of the viewer.

The authorizing application can also be configured to determine a relative position of the inserted object relative to other objects in the 3D environment. In accordance with embodiments of the disclosed technology, it has been recognized that placing the objects in a Cartesian coordinate system may not provide a suitable view to the viewer. For example, if the objects are arranged along one- or two-dimension along a longitudinal or transverse direction, some objects would appear larger than others even though the objects are all of the same size. To address the foregoing challenge, several embodiments of the disclosed technology utilize a cylindrical coordinate system to place the objects along a circular arc around the position of the viewer. As such, each object can be place at generally equal distance from the position of the viewer with corresponding different angle values in the cylindrical coordinate system. Such a placement arrangement can provide a suitable viewing experience to viewers because all the objects in the 3D environment can appear to be generally the same size.

The authorizing application can also be configured to modify a relative position of the inserted objects relative to other neighboring objects in the 3D environment in response to a position, a change of position, or size of an object in the 3D environment. For example, while viewing all the objects, the viewer can select one of the objects for an enlarged view. In response to an enlarged size of the selected object, the authoring application can be configured to recalculate a relative position of neighboring objects by determining an occupied angle of the enlarged object and shifts the neighboring objects along the circular arc while maintaining the original angle separation relative to the enlarged object. For example, the authoring application can determine that the occupied angle of the enlarged object has changed from (−5°-5°) to (−10°-10°). As such, the authoring application can shift neighboring objects away from the enlarged object by −5° on each side. By shifting the neighboring objects in such a manner, risks of overlapping the neighboring objects with the enlarged objects can be reduced or even eliminated.

As such, several embodiments of the disclosed technology can provide a user friendly authoring environment that allows a user to intelligently place supported 2D or 3D content items into the template of the 3D environment. By automatically positioning and/or re-positioning the objects in the 3D environment according to the cylindrical coordinate system, several embodiments of the disclosed technology can eliminate repetitive trial and error experimentations to determine the optimal placement and/or arrangement of the inserted objects, and thus improving productivity and user friendliness of creating 3D content.

DETAILED DESCRIPTION

Figure 1:
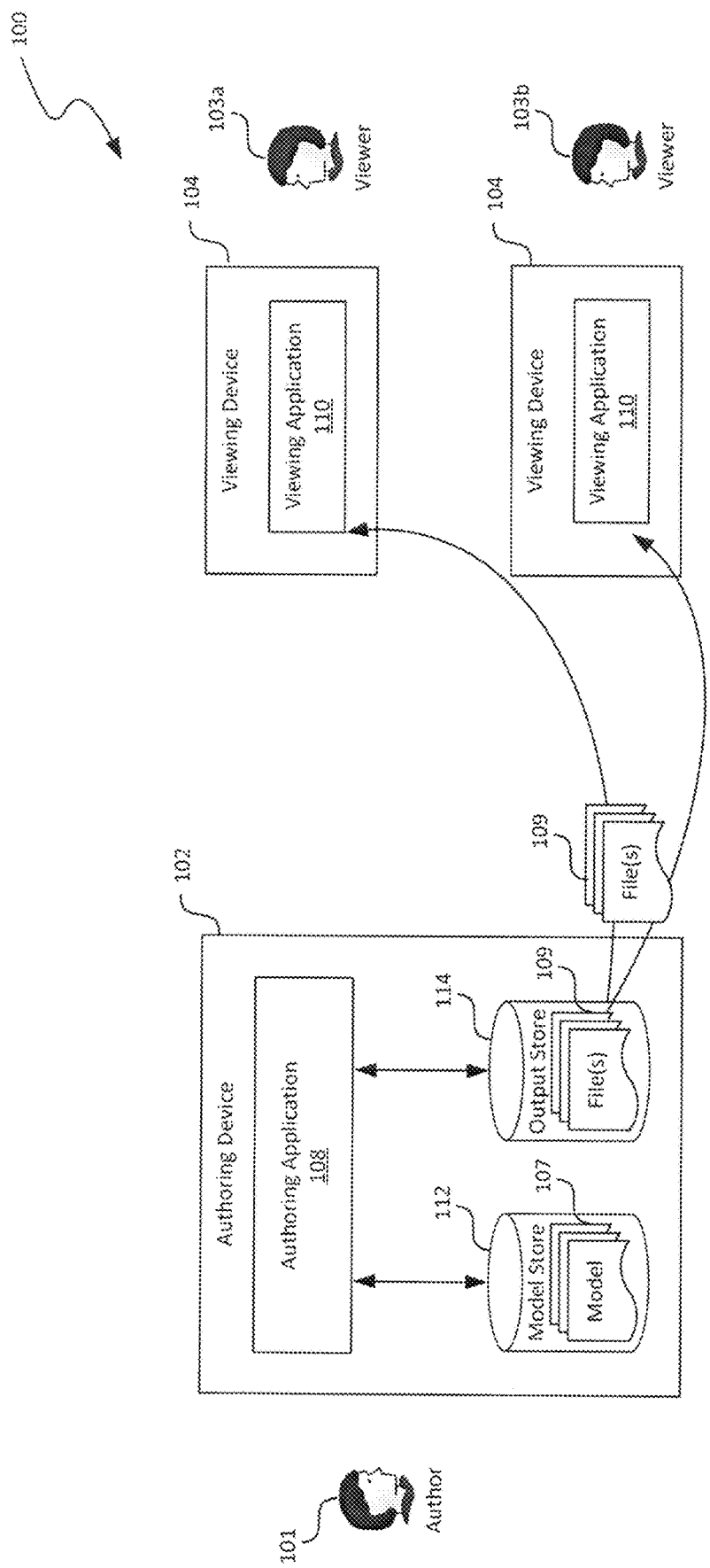
FIG. 1 is a schematic diagram illustrating a computing framework implementing automatic placement and arrangement of content items in a 3D environment in accordance with embodiments of the disclosed technology.

Certain embodiments of systems, devices, components, modules, routines, data structures, and processes for automatic placement and arrangement of content items in a 3D environment are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, a "three-dimensional environment" or "3D environment" generally refers to a computer-based simulated 3D platform in which 2D or 3D representations of images, videos, sounds, or other digital content items can be presented to a viewer. A 3D environment can be a virtual space, such as a virtual reality (VR) world, or can be a real world space in which content can be displayed or layered on top of the real world, such as via augmented reality (AR), mixed reality (MR), or other VR techniques.

Also used herein, the term "model" generally refers to data representing a two-dimensional (2D) or 3D content item that can be rendered in a 3D environment. Example models can include data representing a virtual room, a virtual scene, or any other subpart of a virtual world. Example content items can include images, videos, sounds, documents, or other suitable types of content. Further used herein, the term "object" or "virtual object" generally refers to a visual representation of a 2D or 3D content item rendered in a 3D environment. Example objects can include 3D images, video recordings, etc.

Aspects of the present disclosure are related to 3D environment authoring and generation using an authoring application. A 3D environment can contain one or more models individually include a virtual room, a virtual scene, or any other subpart of a virtual world. A user of the authoring application can graphically select supported two-dimensional (2D) or 3D representations of models of content items and insert the selected representations into a 3D environment. In response, the authoring application can automatically determine placement and/or arrangement of the inserted content items such that a suitable view of the corresponding objects in the 3D environment is obtained. The 3D environment can then be stored as an environment data file containing information relating to the one or more models and/or content items in the 3D environment.

In certain embodiments, different types of content items can be embedded or included in the 3D environment. Example content types can include 3D objects (e.g., 3D models, figures, shapes, etc.) or 2D objects (e.g., files, images, presentations, documents, web sites, videos, remote resources, etc.), etc. In other embodiments, a 3D environment can be a virtual space, such as a virtual reality (VR) world, or can be a real world space in which content can be displayed or layered on top of the real world, such as via augmented reality (AR), mixed reality (MR), or other VR techniques. The 3D environment with the inserted models can then be stored as an environment data file later used to reproduce a 3D environment having 3D renderings of the inserted models.

A 3D environment authored according to aspects disclosed herein can then be consumed using a viewing application on a viewing device such as a desktop computer or a smartphone. In one example, a 3D environment can be experienced across a wide spectrum of computing devices, ranging from low-end devices (e.g., GOOGLE CARDBOARD) to high-end devices (e.g., MICROSOFT HOLOLENS, OCULOUS RIFT, HTC VIVE, etc.). By using desktop or mobile computing devices to generate 3D environments, additional related overhead (e.g., the transmission of all required textures, light maps, audio files, etc.) can be avoided. Further, device-specific or platform-specific particularities can be handled by the viewing application, thereby making such particularities invisible to both the end-user and the author of the 3D environment.

The viewing application can comprise computing resources associated with the models used by the environment data file. In some examples, the environment data file can comprise computing resources for use when rendering the 3D environment or resources can be retrieved from a server or other remote location. When rendering the 3D environment, the viewing application can identify one or more anchor points when stitching adjacent or connected models specified by the environment data file together into a 3D environment. As an example, a model can comprise an entry anchor point and an exit anchor point. The entry anchor point can indicate a doorway or other entrance into the model, and the exit anchor point can indicate a doorway or other exit from the model. Thus, when stitching multiple models (e.g., adjacent or connected models) together, the exit anchor point of a first model can be used to position the entry anchor point of a second model (and, by extension, the second model), thereby creating a continuous combination of the models.

Authoring content in a 3D environment can be challenging because of a whole range of authoring activities that are absent from 2D authoring. For example, placement and arrangement of objects in 3D environment can be quite different than in a 2D environment. In 2D authoring, when inserting an object into a 2D environment, the inserted object can be extended horizontally, vertically, or both, from any existing objects. However, such one- or two-dimensional extension can cause occlusion in a 3D environment because an existing object can be partially or completely in front or behind the inserted object along a depth-dimension. Even without occlusion, one- or two-dimensional extension of the inserted object in a 3D environment can render the object to appear smaller or bigger than the existing objects because of a distance difference from the viewer along a depth dimension. As such, appearance uniformity of the objects can be lacking in the 3D environment.

Several embodiments of the disclosed technology can address at least some aspects of the foregoing challenge by automatically placing and arranging 2D or 3D content items as objects in a 3D environment while taking into account of a combination of (i) a viewer's depth reception; (ii) the viewer's field of view; (iii) relative positions of one object relative to neighboring object in the 3D environment; and (iv) a field of view of an AR/VR/MR headset. An environment data file can then be generated based on the automatically placed content items to create a file containing 3D content that can be distributed to other computing devices, as described in more detail below with reference to FIGS. 1-6.

FIG. 1 is a schematic diagram illustrating a computing framework 100 for automatic placement and arrangement of content items in a 3D environment in accordance with embodiments of the disclosed technology. As shown in FIG. 1, the computing framework 100 can include an authoring devices 102 corresponding to an author 101 and one or more viewing devices 104 corresponding to viewers 103 (shown as first and second viewers 103*a* and 103*b*). The authoring device 102 and the viewing devices 104 can individually include a mobile computing device, a laptop, a tablet computer, a desktop computer, or other suitable types of computing device. Even though only one authoring device 101 and two viewing devices 103 are shown in FIG. 1 for illustration purposes, in other embodiments, the computing framework 100 can facilitate content authoring for additional authors 101 and/or viewers 103 with corresponding authoring and viewing devices (not shown). Example of computing devices suitable for the authoring device 102 and viewing devices 104 are described below in more detail with reference to FIG. 6.

As shown in FIG. 1, the authoring device 102 can include an authoring application 108, a model store 112 containing data records of models 107, and an output store 114 containing data records of 3D environment data files 109. The authoring application 108 can be configured to provide the author 101 a user interface 130 (shown in FIG. 2A) representing a 3D environment having a 3D working area to facilitate authoring content in the 3D environment. In certain embodiments, the authoring application 108 can be a web-based application accessible by the author 101 via a web browser. In other examples, the authoring application 108 can be an executable application, which can be retrieved and executed by a processor of the authoring device 102.

In one embodiment, the authoring application 108 can be configured to display 2D or 3D representations of one or more models 107 of available content items in a gallery, list, or other suitable form. The author 101 can then select and insert a content item into the provided 3D environment as an object corresponding to a content item. In other embodiments, the authoring application 108 can provide a variety of themes. Different models 107 can be associated with one or more themes, or can be altered or adapted based on a selected theme (e.g., colors, textures, lighting, etc.). As described in more detail below with reference to FIGS. 2A-2D, the authoring application 108 can contain additional modules and routines configured to automatically position and arrange the inserted objects such that the author 101 can place content items as objects into the 3D environment without labor intensive trial and error experimentations.

The model store 112 can store one or more models 107 representing corresponding content items that can be used to author a 3D environment. In one example, models 107 may be associated with one or more themes. When the author 101 selects a theme, the authoring application 108 can provide one or more models 107 associated with the selected theme. In some examples, a set of models 107 can be designed such that stitching a model 107 together with another model 107 from the same set can form a seemingly continuous model 107. In other examples, aspects of a model 107 stored in the model store 112 can be generated dynamically or programmatically. In certain embodiments, the author 101 can create the models 107 using the authoring application 108. In other embodiments, the models 107 can be retrieved from, for example, third party vendors of 2D or 3D content items, or from other suitable sources.

In certain embodiments, a model 107 may indicate that certain aspects may be substituted depending on another model 107 with which the original model 107 can be stitched. As an example, a first model 107 can indicate that a wall or archway may be replaced with a door. As such, an entry point of a second model may be stitched to the first model at the door. In other embodiments, other suitable replacement or model generation techniques may be used to generate the various models 107.

The authoring application 108 can also be configured to output an authored 3D environment as an environment data file 109 containing 3D environment data to, for example, the output store 114. In one implementation, the environment data file 109 can comprise data associated with selected models 107 (e.g., a model identifier, a model name, a model type, etc.), positioning information (e.g., coordinates, anchor point identifiers, etc.), content information (e.g., which content should be displayed for one or more anchor points, the content to be displayed, a reference to content, etc.), custom resources (e.g., custom textures, sounds, etc.), among other information. As shown in FIG. 1, the output store 114 can be configured to store one or more environment data files 109. As used herein, an "environment data file" can include a file on a file system, an entry in a database, or can be stored using any of a variety of other data storage techniques.

As shown in FIG. 1, the viewing devices 104 can each contain a viewing application 110 configured to generate, view, explore, and/or interact with a 3D environment based on an environment data file 109. In one example, viewing application 110 may be a web-based application accessible using a web browser. In other examples, the viewing application 110 can be an executable application for the viewing devices 104. In operation, the viewing application 110 can be configured to evaluate an environment data file 109 to identify one or more models 107 of a 3D environment. If an environment data file 109 references a plurality of models 107, the models 107 may be stitched together when rendering the 3D environment. The viewing application 110 can populate the rendered 3D environment with content based on the content specified by the environment data file 109. In one example, the viewing application 110 can use any of a variety of 3D rendering engines and can handle device- and/or engine-specific implementation details when rendering the 3D environment.

In certain embodiments, the viewing application 110 can be configured to retrieve an environment data file 109 from the output store 114, which, in conjunction with one or more models 107 from the model store 112, may be used to generate a 3D environment. In other embodiments in which the viewing application 110 is a locally-executed application, a model store 112 may be stored locally and/or remotely to the viewing device 104 executing the viewing application 110, and at least a part of an environment data file 109 may be retrieved from the output store 114. In further embodiments, the environment data file 109 may be streamed or retrieved in chunks from the output store 114 to the viewing devices 104.

Figure 2A:
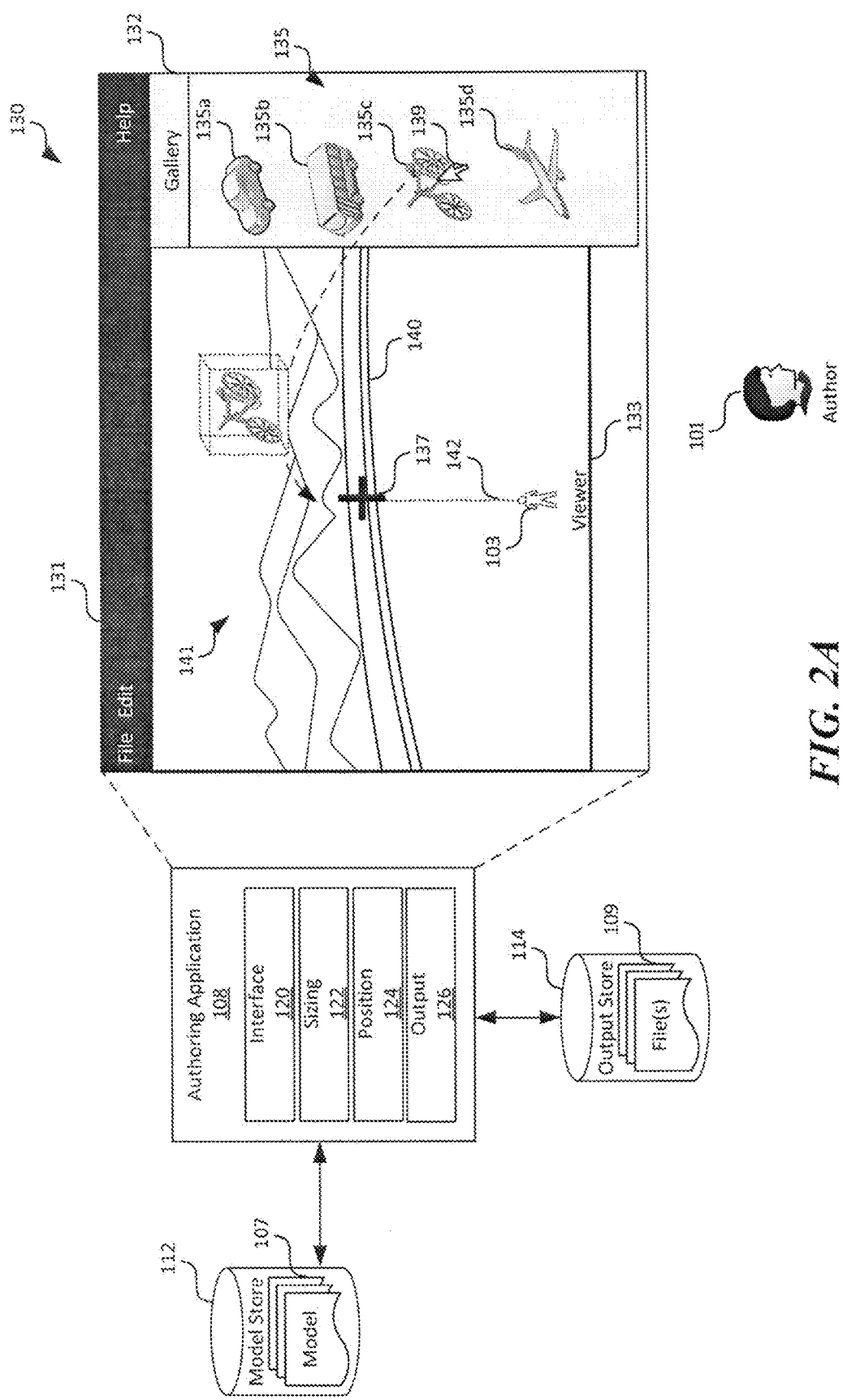
FIGS. 2A-2D are partially schematic diagrams illustrating certain hardware/software components of the computing framework of FIG. 1 in accordance with embodiments of the disclosed technology.

FIGS. 2A-2D are partially schematic diagrams illustrating certain hardware/software components of the computing framework 100 of FIG. 1 in accordance with embodiments of the disclosed technology. As shown in FIG. 2A, the authoring application 108 can include an interface component 120, a sizing component 122, a position component 124, and an output component 126 operatively coupled to one another. Even though particular components are shown in FIG. 2A for illustration purposes, in other embodiments, the authoring application 108 can also include an input component or other suitable types of component.

In FIG. 2A and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software.

Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the interface component 120 of the authoring application 108 can be configured to provide a user interface 130 for facilitating the author 101 to create and/or modify content in a 3D environment. In the illustrated example, the user interface 130 can include a menu bar 131 containing one or more menu groups such as "File," "Edit," and "Help." Each of the foregoing menu groups may be expanded for additional menu items such as "New," "Open," "Save," etc. In other examples, the menu bar 131 can include other suitable types of menu items.

As shown in FIG. 2A, the user interface 130 can also include a 3D working area 133 and a gallery 132 containing multiple objects 135 corresponding to the models 107 in the model store 112. The 3D working area can be initially loaded with a template 141 of a 3D environment or with a previously saved 3D environment corresponding to an environment data file 109 in the output store 114. In the illustrated example, the 3D working area 133 is loaded with a template 141 of a 3D environment having a mountain, a sky, and an open ground in front of the mountain. The objects 135 include a car, a bus, a bicycle, and a plane. In other examples, the template 141 can include forest, buildings, or other suitable types of 3D environment while the objects can include tents, cloths, or any other suitable types of objects.

The interface component 120 can also be configured to provide one or more anchor points 137 in the template 141 for placement of 2D or 3D objects from, for example, the gallery 132. In FIG. 2A, the anchor point 137 is represented as a cross. In other embodiments, the anchor point 137 can also be represented as an arrow, star, or other suitable representation. In certain embodiments, the anchor point 137 can be designated by the author 101 by, for example, placing the anchor point 137 at an author selected location. In other embodiments, the anchor point 137 can be automatically determined by the interface component 120 at a location by the position component 124 as described below and provided in the 3D working area as one of multiple default anchor points 137. In further embodiments, the interface component 120 can allow the author 101 to place the anchor point 137 at locations within certain limited areas in the 3D environment.

As shown in FIG. 2A, the interface component 120 can also be configured to detect that the author 101 selects an object (e.g., the bicycle 135c) from the gallery 132 (e.g., with the cursor 139) and a user input to insert the bicycle 135c into the 3D working area 133 at the anchor point 137, via, for instance, drag and drop, as indicated by the dotted arrow. The interface component 120 can then pass the detected user input to the sizing component 122 for determining whether the selected object 135 requires resizing.

In one embodiment, the sizing component 122 can be configured to determine whether the selected object requires resizing by fitting the selected object 135 into a container of a preset size. For example, in a particular implementation, the sizing component 122 can be configured to fit the bicycle 135c into a cube having a one cubic meter volume. In other examples, the sizing component 122 can be configured to fit the selected object 135 into a sphere, a cylinder, or other suitable shapes of volume with suitable sizes.

In response to determining that the bicycle 135c exceeds the container in at least one dimension, the sizing component 122 can resize the bicycle 135c so the bicycle 135c just fits inside the container. On the other hand, when the bicycle 135c is too small, for example, not having at least one dimension within 90%, 95%, or other suitable threshold of a corresponding dimension of the container, the sizing component 122 can also enlarge the bicycle 135c to be sized just to fit into the container. Such resizing can thus render all inserted objects 135 to be approximately the same size for optimal viewing in the 3D environment.

Upon completion of the foregoing sizing operations, the sizing component 122 can pass control to the position component 124 for determining a position for the inserted object 135. In accordance with embodiments of the disclosed technology, it has been recognized that placing the objects 135 in a Cartesian coordinate system in the 3D environment may not provide a suitable view to the viewers 103. For example, if the objects 135 are arranged along one- or two-dimension along a longitudinal or transverse direction, some objects 135 may appear larger than others even though the objects are all of the same size.

To address the foregoing challenge, several embodiments of the disclosed technology utilize a cylindrical coordinate system to place the objects 135 along a circular arc 140 around the position of the viewer 103. As such, each object 135 can be place at generally equal radial distance from the position of the viewer 103 with corresponding angle values relative to a default view position (shown in FIG. 2A as the viewer 103). Such a placement arrangement can provide a suitable viewing experience to the viewer 103 because all the objects in the 3D environment can appear to be generally the same size. For example, as shown in FIG. 2A, the position component 124 can be configured to determine a line of sight 142 for the viewer 103 from the default position of the viewer 103. Upon obtaining a direction of the line of sight 142, the position component 124 can be configured to place the selected bicycle 135c along the circular arc 140 around the viewer 103 at a preset distance, e.g., 3 meters. In other embodiments, the other suitable preset distances such as 2.5 meters, 3.5 meters, etc. may also be used.

Figure 2B:
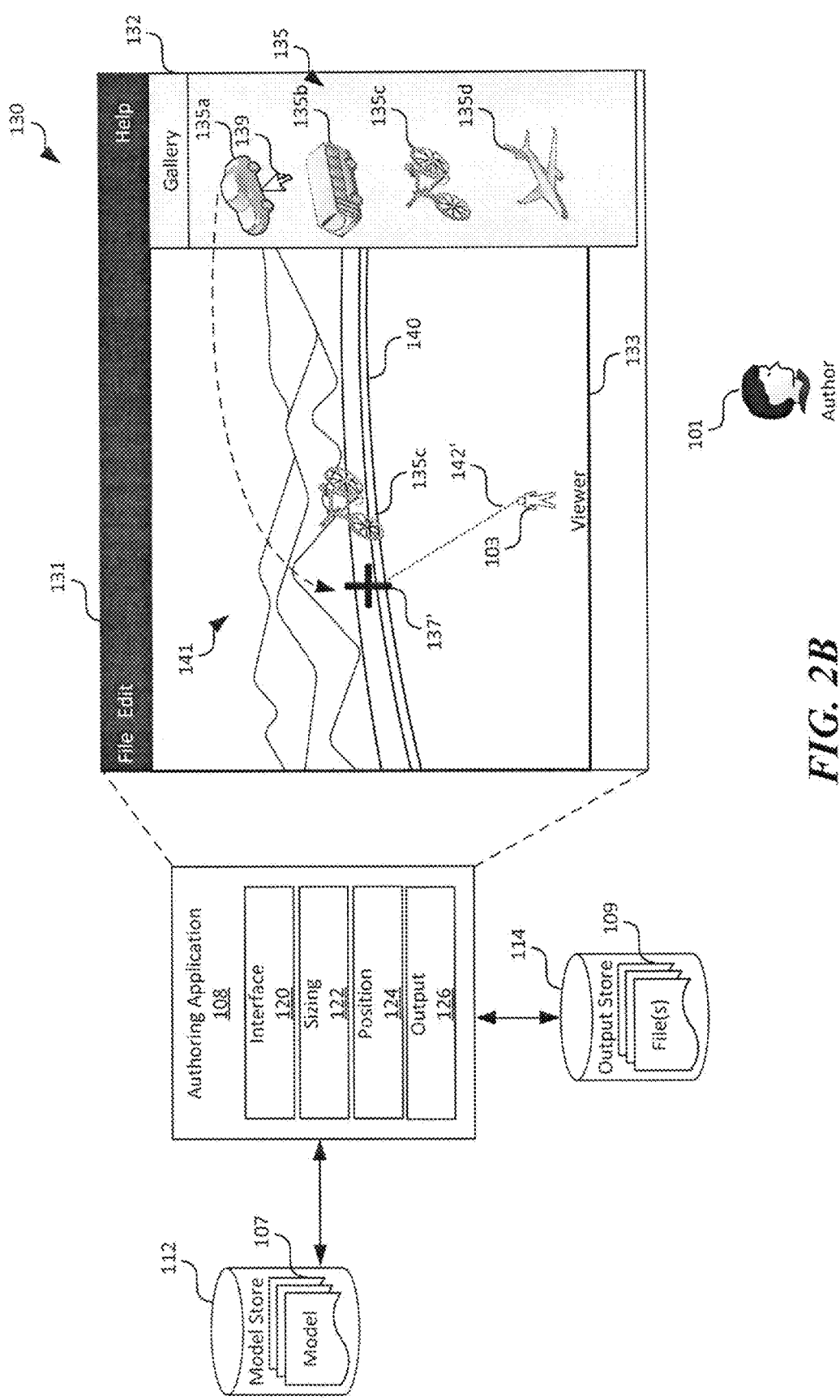

Upon determining the position for the selected bicycle 135c, the position component 124 can be configured to place the bicycle 135c at the determined position at or near the anchor point 137, as shown in FIG. 2B. Once the bicycle 135c is placed into the 3D environment, the author 101 may choose to insert another object 135, e.g., the car 135a into the 3D environment next to the bicycle 135c at or near another anchor point 137'. In response to this user input, the sizing component 122 can be configured to resize the car 135a as needed, as described above with reference to FIG. 2A. The position component 124 can then determine a location at the preset distance (e.g., 3 meters) from the viewer 103 along the circular arc 140 based on a line of sight 142' of the viewer 103.

In accordance with embodiments of the disclosed technology, the position component 124 can also be configured to determine whether the inserted object 135 (e.g., the car 135a) would have any neighboring objects 135 by, for example, searching around the determined location for the car 135 along all three dimensions. In the illustrated example, the position component 124 would detect that the bicycle 135c is nearby. The position component 124 can then be configured to determine whether the car 135a and the bicycle 135c would be spaced apart by at least a threshold angle (e.g., 0°, 1°, 2°, 5°, etc.) in the cylindrical coordinate system. Techniques for such a determination are described in more detail below with reference to FIGS. 3A-3B.

Figure 2C:
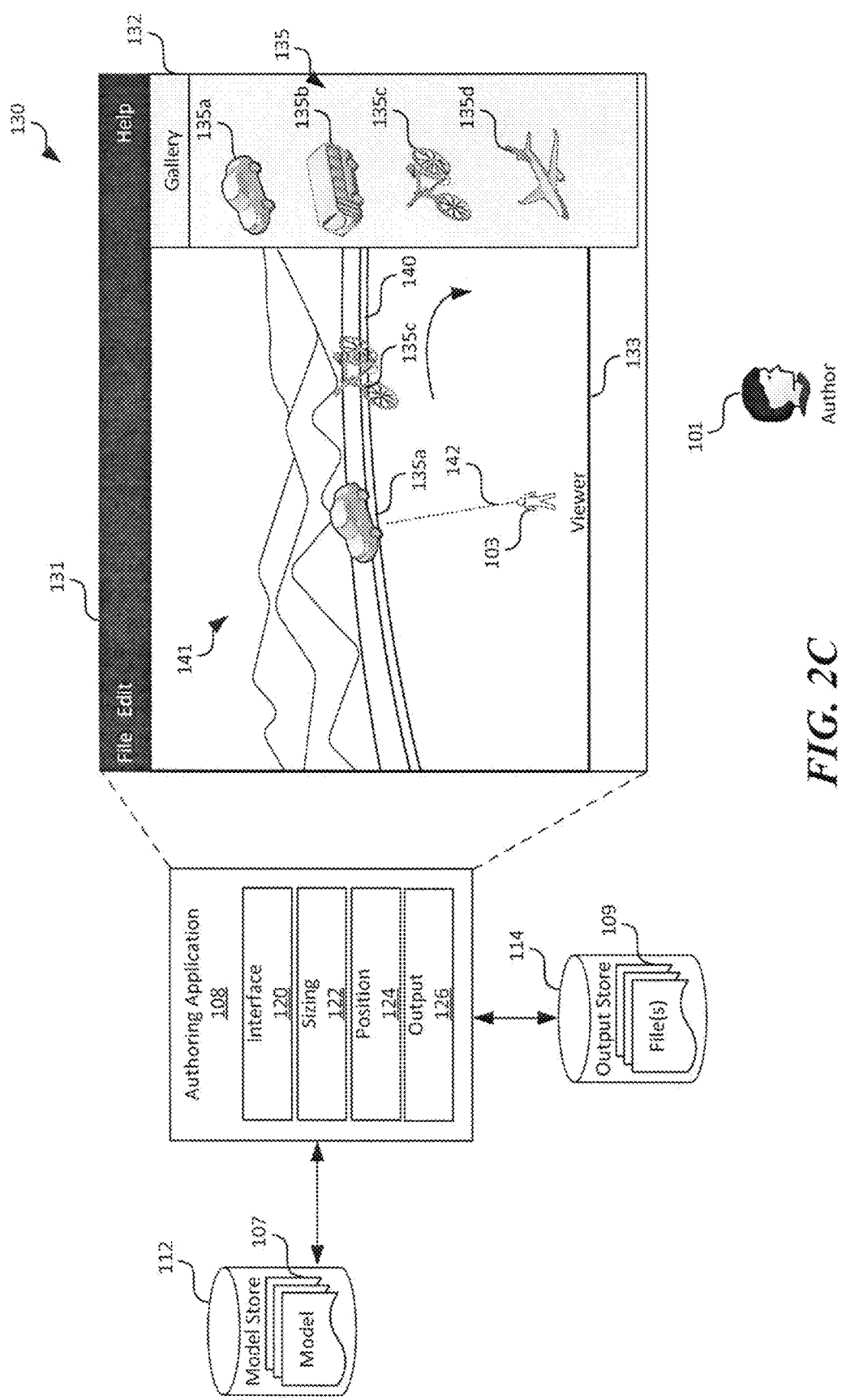

In response to determining that the car 135a and the bicycle 135c are spaced apart by a threshold angle, the position component 124 can be configured to place the car 135a at the determined position. In response to determining that the car 135a and the bicycle 135c are not spaced apart by the threshold angle, the position component 124 can be configured to shift positions of one or both of the car 135a or the bicycle 135c along the circular arc 140 such that the threshold angle between the car 135a and the bicycle 135c is achieved. For example, as shown in FIG. 2C, the bicycle 135c can be shifted around the viewer 103 toward the right such that the car 135a can be placed at the determined position.

The foregoing neighboring object arrangement technique can at least reduce if not eliminate risks of occlusion of the objects 135. For instance, in the illustrated example above, if the car 135a and the bicycle 135c were placed too close to one another, the car 135a may appear to partially overlap with the bicycle 135c. Such overlapping can cause confusion or other negative effects to the viewer 103. By maintaining a threshold angle separation between neighboring objects 135, both the car 135a and the bicycle 135c can be properly presented in the working area 133. The foregoing operations may be repeated to add, for example, a bus 135b into the 3D environment, as shown in FIG. 2D.

Figure 2D:
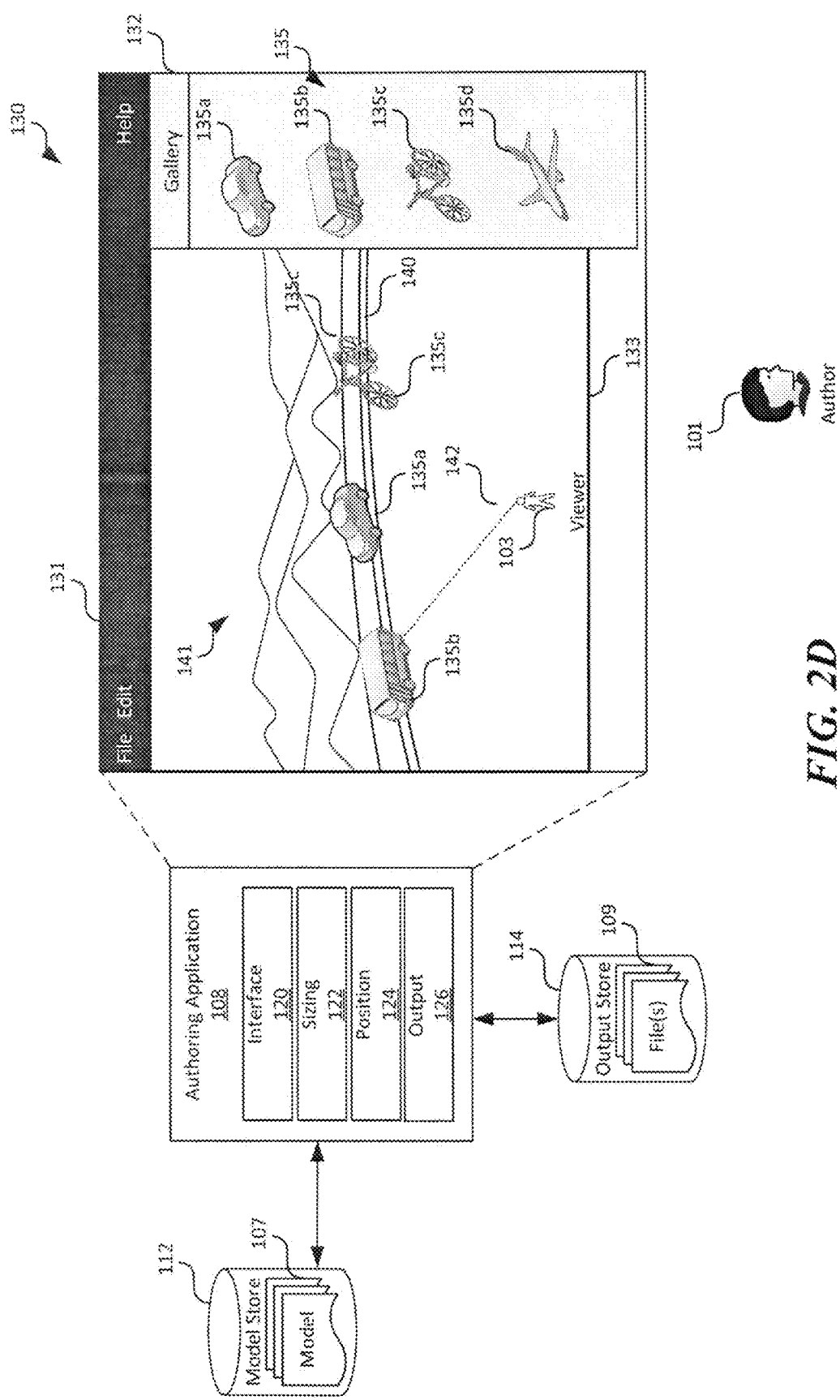

As shown in FIG. 2D, all of the inserted objects 135, i.e., the bus 135b, the car 135a, and the bicycle 135c would appear to the viewer 103 as approximately the same size and at an approximately equal distance. Without being bound by theory, it is recognized such an arrangement in a 3D environment can allow suitable or even optimal viewing of the inserted objects 135 in the 3D environment. Thus, by automatically arranging and placing the objects 135 in such a manner, the author 101 can create a useable 3D environment with suitable content items by simply inserting objects 135 from the gallery 132. Thus, 3D environments with rich content may be created without labor intensive trial and error for finding suitable locations for the objects in 3D environments.

When the author 101 finishes inserting objects 135 into the 3D environment, the output component 126 can be configured to generate an environment data file 109 to be stored in the output store 126. The environment data file 210 can contain data representing the template 141 of the 3D environment as well as an identity, position, size, relative location, or other suitable information of the objects inserted into the template 141.

Figure 3A:
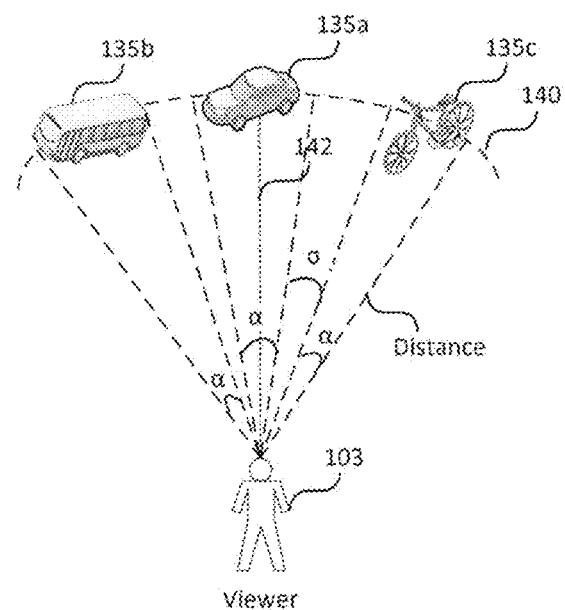
FIGS. 3A and 3B are schematic diagrams illustrating certain positional adjustment in a 3D environment during certain stages of operation in accordance with embodiments of the disclosed technology.
Figure 3B:
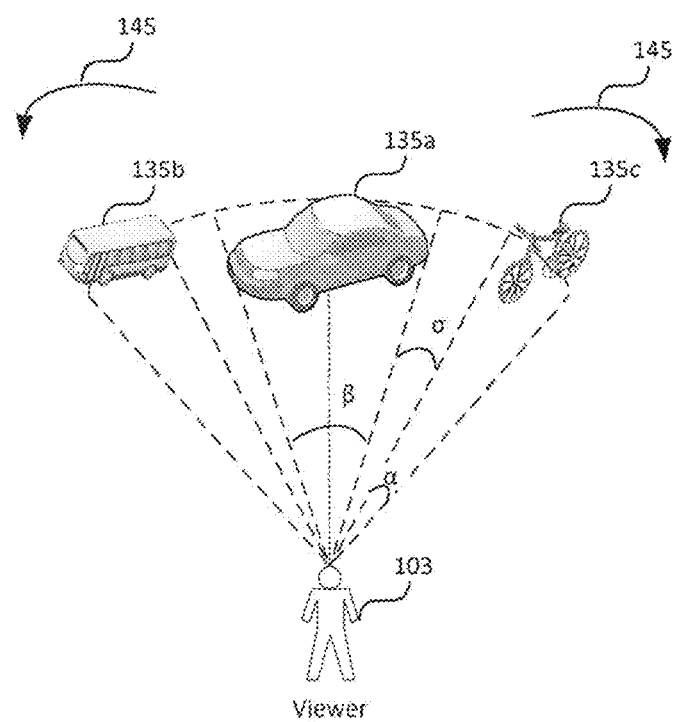

FIGS. 3A and 3B are schematic diagrams illustrating certain positional adjustment in a 3D environment during certain stages of operation in accordance with embodiments of the disclosed technology. As shown in FIG. 3A, the various inserted objects 135 can be placed along the circular arc 140 in a cylindrical coordinate system in which each object 135 has an angle and distance relative to the viewer 103 and is located on the same plane. Based on a size of the objects 135 and the distance from the viewer 103, an angle (α) of each object can be derived by, for example, as follows:

$$\alpha = 2 \times \arcsin(\text{width} / 2 \times \text{distance})$$

where width is a viewed width of the individual objects and the distance is the distance from the viewer 103.

In the illustrated example in FIG. 3A, the line of sight 142 can denote 0°. As such, the bus 135b can have an angle of (−10°, −15°); the car 135a can have an angle of (+5°, −5°); the bicycle 135c can have an angle of (+10°, +15°). Based on the foregoing angle values, an angle separation (σ) between neighboring objects 135 can be derived. For instance, in the example above, the angle separation between the bus 135b and the car 135a is 5° while the same separation exists between the car 135a and the bicycle 135c. As described above with reference to FIGS. 2A-2D, the position component 124 (FIG. 2A) can be configured to compare the angle separations to a threshold value and determine whether to shift corresponding objects 135.

As shown in FIG. 3B, the viewer 103 may chose to have a more detailed view of the car 135a by, for instance, enlarging (and/or bringing closer) the car 135a to the viewer 103. As a result, the angle (β) of the car 135a changes, for instance, from (+5°, −5°) to (+8°, −8°). As such, an angle separation (a) between the car 135a and the bicycle 135c and between the car 135a and the bus 135b decreases to 3°. In accordance with embodiments of the disclosed technology, in response to the decrease in the angle separation, the position component 124 can be configured to shift the neighboring objects 135, e.g., the bicycle 135c and the bus 135b along the circular arc 140 in respective direction such that the angle separation threshold (e.g., 5°) can be maintained, as indicated by the arrows 145.

Figure 4:
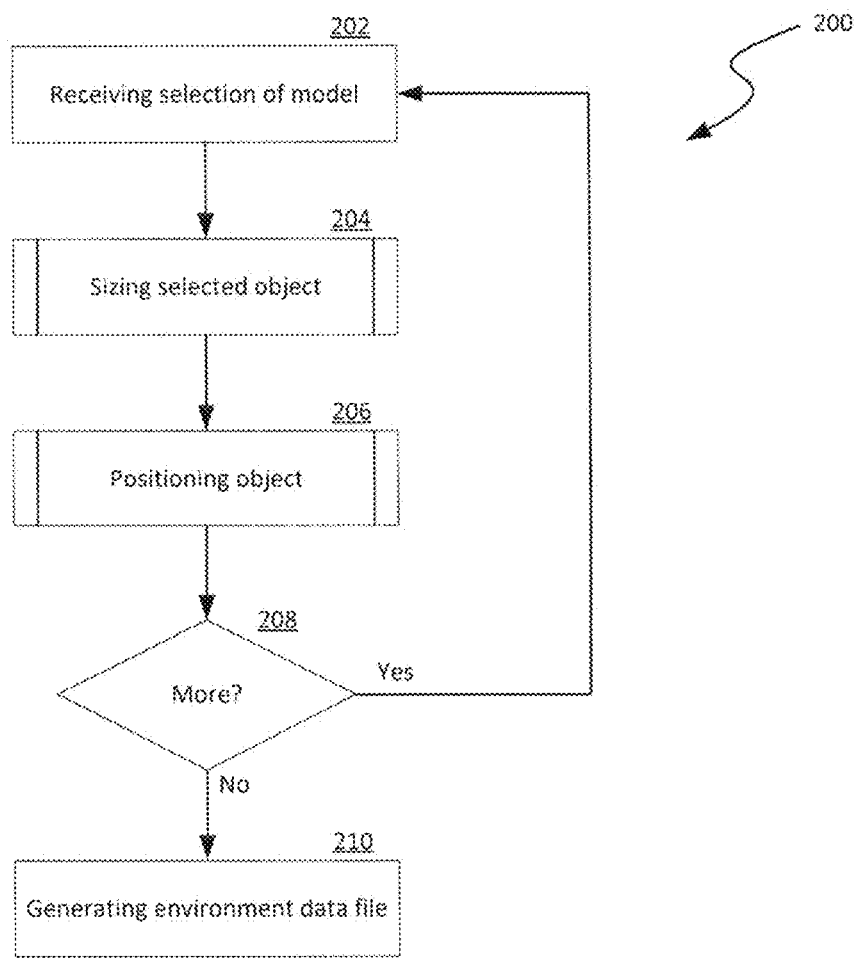
FIGS. 4-5B are flowcharts illustrating certain processes of automatic placement and arraignment of objects in a 3D environment in accordance with embodiments of the disclosed technology.

FIGS. 4-5C are flowcharts illustrating certain processes of automatic placement and arraignment of objects in a 3D environment in accordance with embodiments of the disclosed technology. Even though the processes are described below with reference to the computing framework 100 of FIGS. 1-2D, in other embodiments, the processes can be implemented in computing frameworks with additional and/or different components.

As shown in FIG. 4, a process 200 of automatic placement and arrangement of objects in a 3D environment includes receiving a selection of a model corresponding to a content item to be placed as an object in the 3D environment at stage 202. In one embodiment, the selection can be received by detecting that an author 101 (FIG. 2A) dragged and dropped a graphic representation of the model into the 3D environment, as shown in FIG. 2A. In other embodiments, the selection can be received by detecting an insert command, a copy/paste command, and/or other suitable commands.

Upon receiving the selection of the model, the process 200 can include sizing a virtual object described by the model at stage 204. In certain embodiments, sizing the virtual object can initially include determining whether the object requires resizing, for example, by using a container shown in FIG. 2A. In response to determining that resizing is needed, the virtual object can be resized, for example, proportionally along three dimensions such that the object is not too large or small when compared to the container. In other embodiments, sizing the virtual object can include modifying at least one dimension of the object based on a preset value without determining whether the object requires resizing. Example operations for sizing the object are described in more detail below with reference to FIG. 5A. In further embodiments, sizing the virtual object can be omitted from the process 200.

The process 200 can then include positioning the object in the 3D environment at stage 206. In certain embodiments, the object can be positioned in the 3D environment based on a cylindrical coordinate system. Each object can be placed according to an azimuth, a radial distance, and a height. For example, a viewer 103 (FIG. 2C) can be an origin of the coordinate system, and the car 135a (FIG. 2C) in FIG. 2C is placed at a coordinate of (0°, 3 meters, 0 meter), corresponding to a location that is on the same plane as the viewer 103, along the line of sight 142 of the viewer 103, and spaced apart from the viewer 103 by 3 meters. In other embodiments, the object can be placed in the 3D environment based on a Cartesian coordinate system, a spherical coordinate system, or other suitable types of coordinate system.

In certain implementations, the position of the object can be along a circular arc 140 (FIG. 2A) that is spaced apart from the viewer 103 by a radial distance. As described above with reference to FIGS. 2A-2D, it was recognized that such a placement of objects can allow the viewer 103 an optimal view of the objects without having some objects appear smaller or larger than other. In other implementations, the position of the object can be along a spherical surface with the viewer 103 being the center, or in other suitable manners. Positioning the object can also include monitoring for neighboring objects and adjusting spacing between neighboring objects based on a threshold separation. Example operations for monitoring separations from neighboring objects are described below with reference to FIG. 5B.

Even though operations of positioning the object in the 3D environment are described above in the context of receiving selection of the model, in other embodiments, such positioning operations can be performed before receiving the selection of the model. For example, in certain implementations, once an author designates a default viewer position, the foregoing positioning operations can be performed to generate one or more anchor points 137 (FIG. 2A), for instance, at a preset radial distance. The author can then insert an object to the pre-populated anchor points via, for example, drag and drop from the gallery 132 (FIG. 2A).

The process 200 can then include a decision stage 208 to determine whether additional input for selecting models are received. In response to determining that additional models are selected, the process 200 reverts to receiving the selection of models at stage 202. Otherwise, the process 200 can proceed to generating an environment data file at stage 210. The environment data file 210 can contain data representing the template 141 of the 3D environment as well as an identity, position, size, relative location, or other suitable information of the objects inserted into the template 141.

Figure 5A:
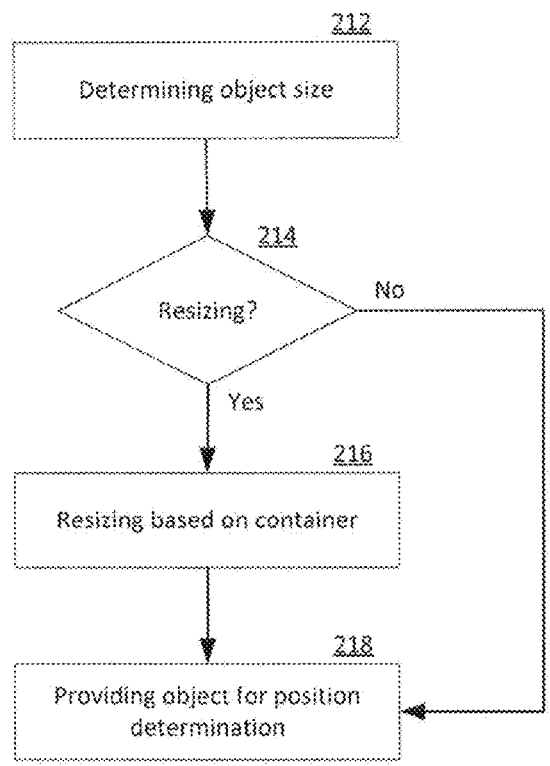

FIG. 5A illustrates example operations for resizing a selected model. As shown in FIG. 5A, the operations can include determining an object size of an object corresponding to the selected model. For example, a size of the bicycle 135c (FIG. 2A) may be expressed as height, width, and length. The values of the foregoing parameters can then be compared to corresponding dimensions of a container, for example, a cube shown in FIG. 2A.

As shown in FIG. 5A, the operations can then include a decision stage 214 to determine whether resizing is needed. In one embodiment, resizing is needed when at least one value of height, width, or length exceeds a corresponding value of the container. In another embodiment, resizing is also needed when at least one value of height, width, or length is less than 90%, 95%, or other suitable percentages of a corresponding value of the container. In further embodiments, resizing can be indicated based on other suitable criteria. In response to determining that resizing is needed, the operations can include resizing the object according to, for example, a height, width, or length of the container. The operations can then include providing the resized object for position determination at stage 218. In response to determining that resizing is not needed, the operations can proceed directly to providing the object for position determination.

Figure 5B:
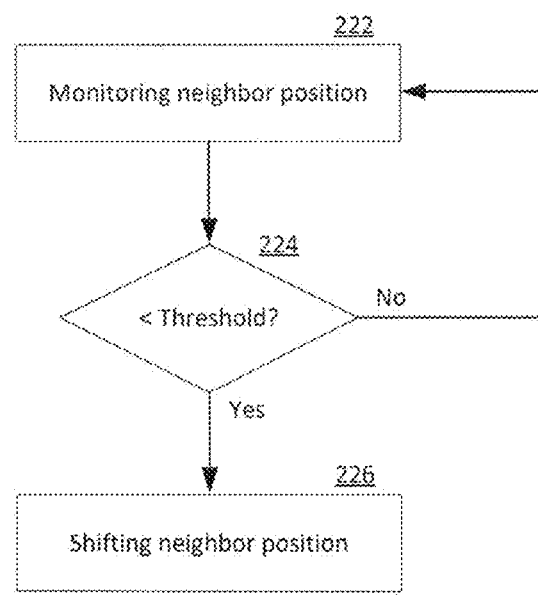

FIG. 5B illustrates example operations for monitoring and adjust for neighboring object positions. As shown in FIG. 5B, the operations can include monitoring for a position of a neighboring object at stage 222. In one implementation, a separation between two neighboring objects can be expressed as an azimuth delta in a cylindrical coordinate system, as described above with reference to FIGS. 3A and 3B. In other embodiments, the separation can also be expressed as a zenith angle and/or a normal angle in a spherical coordinate system, or as other suitable values.

The operations can then include a decision stage 224 to determine whether the separation is less than a threshold. In one implementation, the threshold can be a separation angle of 0°, 2°, 5°, 10°, or other suitable values, as shown in FIGS. 3A and 3B. In other implementations, the threshold can be a separation distance, a separation zenith angle, a separation normal angle, or other suitable values. In response to determining that the separation is less than the threshold, the operations can include shifting one or more of the neighboring objects such that the separation therebetween is not less than the threshold at stage 226. Otherwise, the operations revert to monitoring for neighbor position at stage 222.

Figure 6:
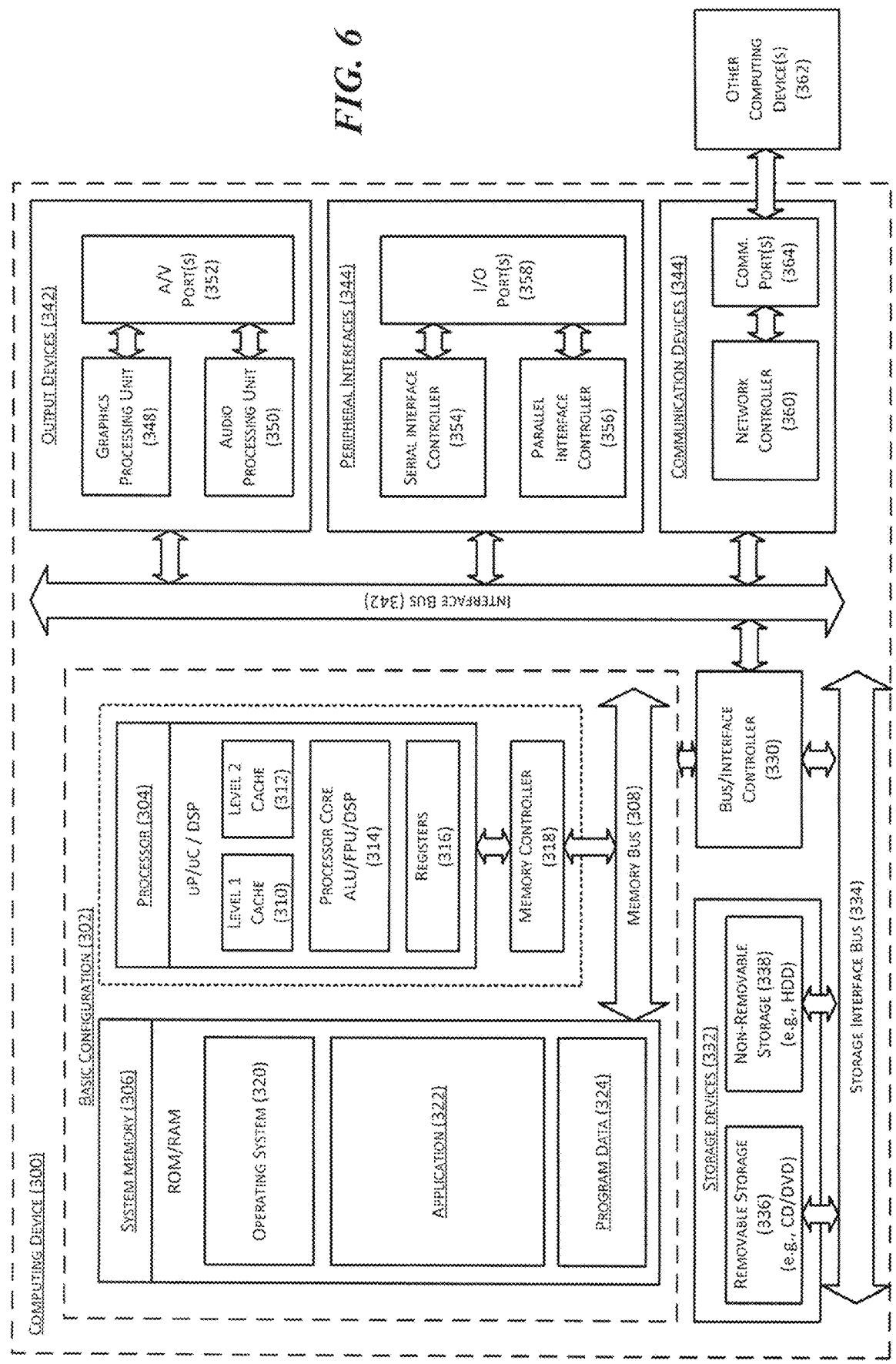
FIG. 6 is a computing device suitable for certain components of the computing framework in FIG. 1.

FIG. 6 is a computing device 300 suitable for certain components of the computing framework 100 in FIG. 1. For example, the computing device 300 can be suitable for the authoring device 102 or the viewing devices 104 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of automatic placement and arrangement of objects in a computer-based three-dimensional (3D) environment when authoring content using a computing device having a display and a processor, the method comprising:
   with the processor of the computing device,
      providing, on the display of a computing device, a template of a 3D environment;
      receiving a user input selecting a model representing a two-dimensional (2D) or 3D content item to be inserted as an object into the template of the 3D environment; and
      in response to receiving the user input selecting the model,
         automatically determining a location to place the object according to a cylindrical coordinate system in the 3D environment having an origin at a default viewer position of a viewer in the 3D environment, wherein the determined location has coordinate values that include an angle value relative to a line of sight of a viewer at the default viewer position, a radius value equal to a preset distance from the origin of the cylindrical coordinate system, and a height value equal to a height of the line of sight of the viewer; and
         rendering and placing a graphical representation of the 2D or 3D content item as the object at the determined location in the 3D environment according to the coordinate values.

2. The method of claim 1 wherein:
   the object is a first object;
   the content item is a first content item; and
   the method further includes:
      receiving, another user input selecting another model representing another two-dimensional (2D) or 3D content item to be inserted as a second object into the template of the 3D environment; and
      in response to receiving the another user input,
         automatically determining another location to place the second object according to the cylindrical coordinate system, wherein the determined another location has additional coordinate values that include another angle value relative to the line of sight of the viewer at the default viewer position, another radius value equal to the same preset distance from the origin of the cylindrical coordinate system, and another height value equal to a height of the line of sight of the viewer; and
         rendering and placing another graphical representation of the 2D or 3D content item as the second object at the determined another location in the 3D environment according to the additional coordinate values.

3. The method of claim 2, further comprising:
   determining whether a difference between the angle values of the first and second objects in the 3D environment is less than a threshold; and
   in response to determining that the difference between the angle values of the first and second objects in the 3D environment is less than the threshold, adjusting one or both of the angle values of the first or second object in the 3D environment such that the difference is not less than the threshold.

4. The method of claim 2 wherein automatically determining another location includes automatically setting the another angle value of the second object equal to the angle value of the first object plus an angle threshold.

5. The method of claim 2 wherein:
   determining whether a difference between the angle values of the first and second objects in the 3D environment is less than a threshold angle of 0°; and
   in response to determining that a difference between the angle values of the first and second object in the 3D environment is less than the threshold angle, shifting one or both of the first or second objects in the 3D environment along the circular arc such that the a difference between the angle values is not less than the threshold angle.

6. The method of claim 2, further comprising:
   enlarging a view of the first object upon a further user request; and
   in response to the further user request,
      determining an azimuth of the enlarged first object in the 3D environment;
      re-calculating whether a difference between the angle values of the first and second objects in the 3D environment is less than a threshold angle based on the determined azimuth of the enlarged first object; and
      in response to determining that the difference between the angle values of the first and second object in the 3D environment is now less than the threshold angle, adjusting the another angle value of the second object in the 3D environment such that the difference between the angle values of the first and second objects is not less than the threshold angle.

7. The method of claim 2, further comprising:
   reducing the radius value of the first object from the preset radial distance in the 3D environment upon a further user request; and
   in response to the further user request,
      determining an azimuth of the first object in the 3D environment according to the reduced radius value;
      re-calculating whether a difference between the angle values of the first and second objects in the 3D environment is less than a threshold angle based on the determined azimuth of the first object; and
      in response to determining that the difference between the angle values of the first and second objects in the 3D environment is now less than the threshold angle, adjusting the another angle value of the second object in the 3D environment such that the difference between the angle values of is not less than the threshold angle.

8. The method of claim 1 wherein the preset radial distance is approximately three meters from the default viewer position.

9. The method of claim 1, further comprising sizing the object according to a preset volume prior to rendering and placing the graphical representation of the 2D or 3D content item as the object at the determined location in the 3D environment according to the coordinate values.

10. A computing device, comprising:
   a processor;
   a display; and
   a memory operatively coupled to the processor and the display, the memory containing instructions executable by the processor to cause the computing device to:
      provide, on the display, a user interface containing a work area having a template of a 3D environment and a gallery containing models of two-dimensional (2D) or three-dimensional (3D) content items;

detect, via the user interface, a user input selecting one of the models from the gallery to be inserted as an object into the template of the 3D environment; and in response to detecting the user input selecting the model, render and surface on the display, a graphical representation of the 2D or 3D content item corresponding to the selected model as the object at a location in a cylindrical coordinate system having an origin at a default viewer position in the 3D environment, wherein the location having a radius value equal to a preset distance from the origin of the cylindrical coordinate system.

11. The computing device of claim 10 wherein the memory contains additional instructions executable by the processor to cause the computing device to:
determine whether a difference between the angle value of the object and that of a neighboring object in the 3D environment is less than a threshold; and
in response to determining that the difference between the angle value of the object and that of the neighboring object in the 3D environment is less than the threshold, shift the object in the 3D environment along a circular arc having a radius equal to the preset distance away from the neighboring object such that the difference in angle values is not less than the threshold.

12. The computing device of claim 10 wherein the memory contains additional instructions executable by the processor to cause the computing device to:
determine whether a difference between the angle value of the object and that of a neighboring object in the 3D environment is less than a threshold angle; and
in response to determining that the difference between the angle value of the object and that of the neighboring object in the 3D environment is less than the threshold angle, shifting at least one of the object or the neighboring object relative to each other along a circular arc having a radius equal to the preset distance such that the difference in the angle values is not less than the threshold angle.

13. The computing device of claim 10 wherein the memory contains additional instructions executable by the processor to cause the computing device to:
determine whether a difference between the angle value of the object and that of a neighboring object in the 3D environment is less than a threshold angle of 5°; and
in response to determining that the difference between the angle value of the object and that of the neighboring object in the 3D environment is less than the threshold angle, shifting at least one of the object or the neighboring object relative to each other such that the separation angle is not less than the threshold angle.

14. The computing device of claim 10 wherein the memory contains additional instructions executable by the processor to cause the computing device to:
enlarge a size of the object upon a further user request; and
in response to the further user request,
determining a new azimuth of the enlarged object in the 3D environment;
re-calculating whether a difference between the angle value of the object and that of a neighboring object in the 3D environment is less than the threshold angle based on the determined new azimuth of the enlarged object; and
in response to determining that the difference between the angle value of the object and that of the neighboring object in the 3D environment is now less than the threshold angle, shifting the object or the neighboring object relative to each other along the circular arc having a radius equal to the preset distance.

15. The computing device of claim 10 wherein the memory contains additional instructions executable by the processor to cause the computing device to:
reduce a radial distance of the neighboring object from the preset radial distance in the 3D environment upon a further user request; and
in response to the further user request,
determine a new azimuth of the neighboring object in the 3D environment;
re-calculate whether a difference between the angle value of the object and that of a neighboring object in the 3D environment is less than a threshold angle based on the determined new azimuth of the neighboring object; and
in response to determining that the difference between the angle value of the object and that of the neighboring object in the 3D environment is now less than the threshold angle, shifting the object or the neighboring object relative to each other along the circular arc having a radius equal to the preset distance.

16. The computing device of claim 10 wherein the memory contains additional instructions executable by the processor to cause the computing device to:
in response to detecting the user input selecting the model,
determine whether a size of a graphical representation of the 2D or 3D content item defined by the model exceeds a preset size; and
in response to determining that the graphical representation of the 2D or 3D content item defined by the model exceeds the preset size, reducing the size of the graphical representation of the 2D or 3D content item to be not larger than the preset size.

17. The computing device of claim 10 wherein the memory contains additional instructions executable by the processor to cause the computing device to:
in response to detecting the user input selecting the model,
determine whether a size of a graphical representation of the 2D or 3D content item defined by the model exceeds a preset size defined by a cube; and
in response to determining that the graphical representation of the 2D or 3D content item defined by the model exceeds the preset size, reducing the size of the graphical representation of the 2D or 3D content item to fit inside the cube.

18. A method of automatic placement and arrangement of objects in a computer-based three-dimensional (3D) environment when authoring content using a computing device having a display and a processor, the method comprising:
with the processor of the computing device,
providing, on the display, a user interface containing a work area having a template of a 3D environment and a gallery containing models of two-dimensional (2D) or 3D content items;
detecting, via the user interface, a user input selecting one of the models from the gallery to be inserted as an object into the template of the 3D environment; and
in response to detecting the user input selecting the model, rendering and surfacing on the display, a graphical representation of the 2D or 3D content item corresponding to the selected model as the object at a location in a cylindrical coordinate system having an origin at a default viewer position in the 3D environment, wherein the location having a radius value equal to a preset distance from the origin of the cylindrical coordinate system.

19. The method of claim 18 wherein:

providing the user interface includes providing a user interface containing a work area having a template of a 3D environment having multiple anchor points;

the individual anchor points are arranged along a circular arc spaced apart from the default viewer position of the viewer of the 3D environment by the preset radial distance; and detecting the user input includes detecting a user input to insert the selected model to one of the anchor points.

20. The method of claim 18 wherein:

providing the user interface includes providing a user interface containing a work area having a template of a 3D environment having multiple anchor points;

the individual anchor points are arranged along a circular arc spaced apart from the default viewer position of the viewer of the 3D environment by the preset radial distance;

detecting the user input includes detecting a user input to insert the selected model to one of the anchor points; and rendering and surfacing the graphical representation of the 2D or 3D content item includes rendering and surfacing the graphical representation of the 2D or 3D content item at the one of the anchor points.

\* \* \* \* \*